United States Patent [19]

Casasent

[11] 4,099,249

[45] Jul. 4, 1978

[54] DOPPLER PROCESSING METHOD AND APPARATUS

[75] Inventor: David Paul Casasent, Pittsburgh, Pa.

[73] Assignee: The United States of America as represented by the Secretary of the Navy, Washington, D.C.

[21] Appl. No.: 771,041

[22] Filed: Feb. 22, 1977

[51] Int. Cl.[2] .......................... G06G 9/00; G01S 11/00

[52] U.S. Cl. .......................................... 364/822; 343/8; 343/100 CL; 364/565

[58] Field of Search ................. 235/181; 343/100 CL, 343/8, 17; 364/826, 827, 822

[56] References Cited

U.S. PATENT DOCUMENTS

| | | | |
|---|---|---|---|
| 3,732,565 | 2/1973 | Symaniec et al. | 235/181 |
| 3,887,923 | 6/1975 | Hendrix | 343/17 |

OTHER PUBLICATIONS

Beard: Imaging by Correlation of Intensity Fluctuations, Applied Physics Letters 10-1-69, vol. 15, No. 7.

Casasent et al.: New Optical Transforms for Pattern Recognition, Proceedings IEEE, vol. 65, No. 1, Jan. 1977, pp. 77-84.

*Primary Examiner*—Felix D. Gruber

*Attorney, Agent, or Firm*—R. S. Sciascia; L. I. Shrago

[57] ABSTRACT

A method and apparatus for determining the value of a Doppler frequency shift component $\Delta f$ present in a signal $f \pm \Delta f$ employing a correlation process which utilizes the Mellin transform and is scale invariant. The location of the correlation peak in the reference coordinate system used provides a measure of the magnitude of $\Delta f$. The sequence of steps involved in the correlation process when optical apparatus is used include forming a transmittance pattern of the signal $f \pm \Delta f$, which has a horizontal scale that is the natural log of the time scale of the original signal, forming a similarly scaled transmittance pattern of the reference signal, $f$, and utilizing the first patttern in the input plane of a frequency plane correlator that has a holographic matched spatial filter that is produced from the second pattern and contains a term corresponding to the conjugate of the Mellin transform of the reference signal in its frequency plane.

12 Claims, 6 Drawing Figures

DOPPLER PROCESSING METHOD AND APPARATUS

The present invention relates generally to apparatus for and methods of processing radar and sonar signals so as to obtain target velocity information.

Doppler information has been extracted from radar and sonar signals in the past by processing the detected signals in a bank of Doppler filters and correlating each signal so obtained with a reference signal. This procedure, however, requires comparatively complex circuits and is time consuming.

In applicant's co-pending application, Ser. No. 731,471, filed 12 Oct. 1976, there is disclosed a radar processor utilizing a multi-channel optical correlator for providing target fine range and Doppler/azimuth angle data. A coordinate of the correlation peak appearing in the output plane of the correlator in one embodiment of the invention is proportional to the target's Doppler. However, the systems disclosed require multiple channel replicas of all signals or replicas of the signal at all possible Dopplers. This requirement imposes restrictions on the bandwidth of the optical system and necessitates comparatively complex signal processing operations.

In applicant's co-pending application Ser. No. 707,977, filed 23 July 1976, there is disclosed apparatus for realizing an optical Mellin transform. This transform has important applications in image processing systems because of its scale invariance. In this regard, the magnitudes of the Mellin transforms $|M_1|$ and $|M_2|$ of two scaled functions, such as $f_1(x,y)$ and $f_2(x,y)$ which equals $f_1(bx,by)$, are identical, and it is this property which is used in the above application to correlate scaled input imagery with no loss in the signal-to-noise ratio of the correlation peak from the autocorrelation case.

One important aspect of the Mellin correlation process is the fact that the correlation peak appearing in the output plane has a coordinate location which provides information on the scale difference between the two functions being compared. It is this feature that is exploited in the present invention to extract Doppler information from radar and sonar signals or any other type of signal reflected or emanating from a moving body.

The frequency $\omega_d$ of the detected electromagnetic radiation emanated by a source moving at a radial velocity v is related to the radiated frequency $\omega_o$ by $$\omega_d = \omega_o\left[\frac{1+v/c}{1-v/c}\right]^{\frac{1}{2}} \simeq (1+2v/c)\,\omega_o \quad (1)$$

where $c$ is the velocity of the waves in the propagating medium. The secondary relationship is valid when $v$ is $<< 2c$. The effect of a Doppler frequency shift that arises as a consequence of relative motion between the source and the receiver is equivalent to scaling the time axis of the signal from $t$ to $at$ where $a$ equals $$\frac{1}{1+\frac{2v}{c}} \simeq 1 - \left[\frac{2v}{c}\right].$$

Thus, the time scale factor is proportional to the target's radial velocity. Therefore, if the signals involved in a Mellin correlation process correspond to, for example, a radar or sonar return and a replica of the transmitted signal, then the scale difference as shown by the position of the correlation peak is proportional to the relative Doppler and the target's radial velocity.

It is, accordingly, an object of the present invention to provide a method for extracting Doppler information from signals which utilizes the Mellin transform.

Another object of the present invention is to provide a signal processor for use with radar or sonar apparatus which utilizes a scale invariant correlator wherein the location of the correlation peak provides target Doppler information.

Another object of the present invention is to provide an electro-optical technique for obtaining Doppler information which may be used in radar, sonar and astronomy.

Another object of the present invention is to provide a signal processor wherein a Mellin correlation operation is performed in real-time with signals representing individual or multiple radar or sonar returns and the correlation peaks yield information on the target's radial velocity.

Another object of the present invention is to provide a method for obtaining Doppler information which uses a correlation process that employs a scale invariant transform.

Other objects, advantages and novel features of the invention will become apparent from the following detailed description of the invention when considered in conjunction with the accompanying drawings wherein:

FIG. 1 sets out the sequence of operation involved in carrying out the Doppler processing method of the present invention;

Briefly, and in general terms, the above objects of invention are accomplished by correlating the composite input signal which corresponds to the transmitted signal, for example, in a correlation process which utilizes Mellin transforms and is scale invariant. The location of the correlation peak in the reference coordinate system used provides a measure of the Doppler frequency. The sequence of steps involved in the correlation process when optical apparatus is employed include forming a transmittance pattern of the composite signal which has a horizontal scale that is the natural log of the time scale of the original input signal, forming a similarly scaled transmittance pattern of the reference signal and utilizing the first pattern in the input plane of the frequency plane correlator that has a holographic matched spatial filter (MSF) that is produced from the second pattern and contains a term corresponding to the conjugate of the Mellin transform of the reference signal in its frequency plane.

Figure 1:
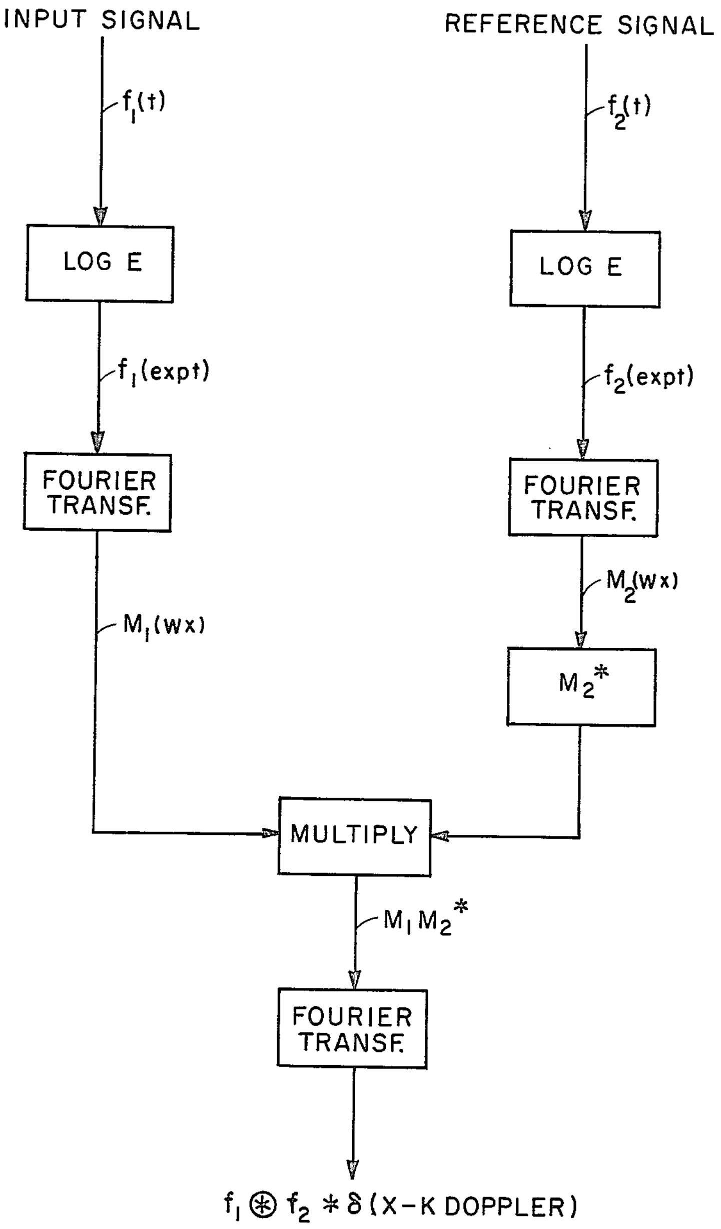

Referring now to FIG. 1 of the drawings which shows one sequence of steps involved in practicing the Doppler signal processing of the present invention, it will be seen that a detected signal $f_1(t)$ which may represent a radar return, a sonar echo or any other signal or radiation carrying Doppler information, and a reference signal $f_2(t)$, which is a replica of the transmitted radar or sonar signal, are each initially subjected to a coordinate transformation which has the effect of forming output signals $f_1(\exp t)$ and $f_2(\exp t)$ that have a time scale that is the natural log of that of the original input signal. This transformation in no way modifies the amplitude characteristics of the signals. Rather, it changes the signal coordinate $(t)$ to $(\exp t)$. Both logarithmically scaled signals are Fourier transformed producing $M_1(\omega_x)$ and $M_2(\omega_x)$ where $M(\omega)$ is the Mellin transform of $f(t)$. The next operation in the method requires that a matched spatial filter M* of one of the signals be formed. Here, this MSF is derived from the reference signal $f_2(t)$ and contains $M_2$*. This MSF is produced by conventional holographic means utilizing the waveform $f_2(\exp t)$ as will be seen in greater detail hereinafter.

In the next step, the product $M_1M_2$* is produced, and in the concluding step, this product is Fourier transformed to yield the correlation $f_1 * f_2$. In the case where the above method is performed with electro-optical means, the location of the correlation peak with respect to a reference axis is proportional to the logarithm of the Doppler shift between the detected and reference signals.

The method described above can be performed by analog, digital, solid state, gradient indices and CCD means and methods and is not restricted to electro-optical apparatus.

In the descriptions and mathematical treatment that follows, the logarithmically scaled signals, which hereinbefore have been denoted as, for example, $f_1(\exp t)$ and $f_2(\exp t)$, will, for simplicity sake, be written as $f_1$ and $f_2$. Their transforms will be designated $M_1$ and $M_2$ and their conjugate transforms $M_1$* and $M_2$*.

Figure 2:
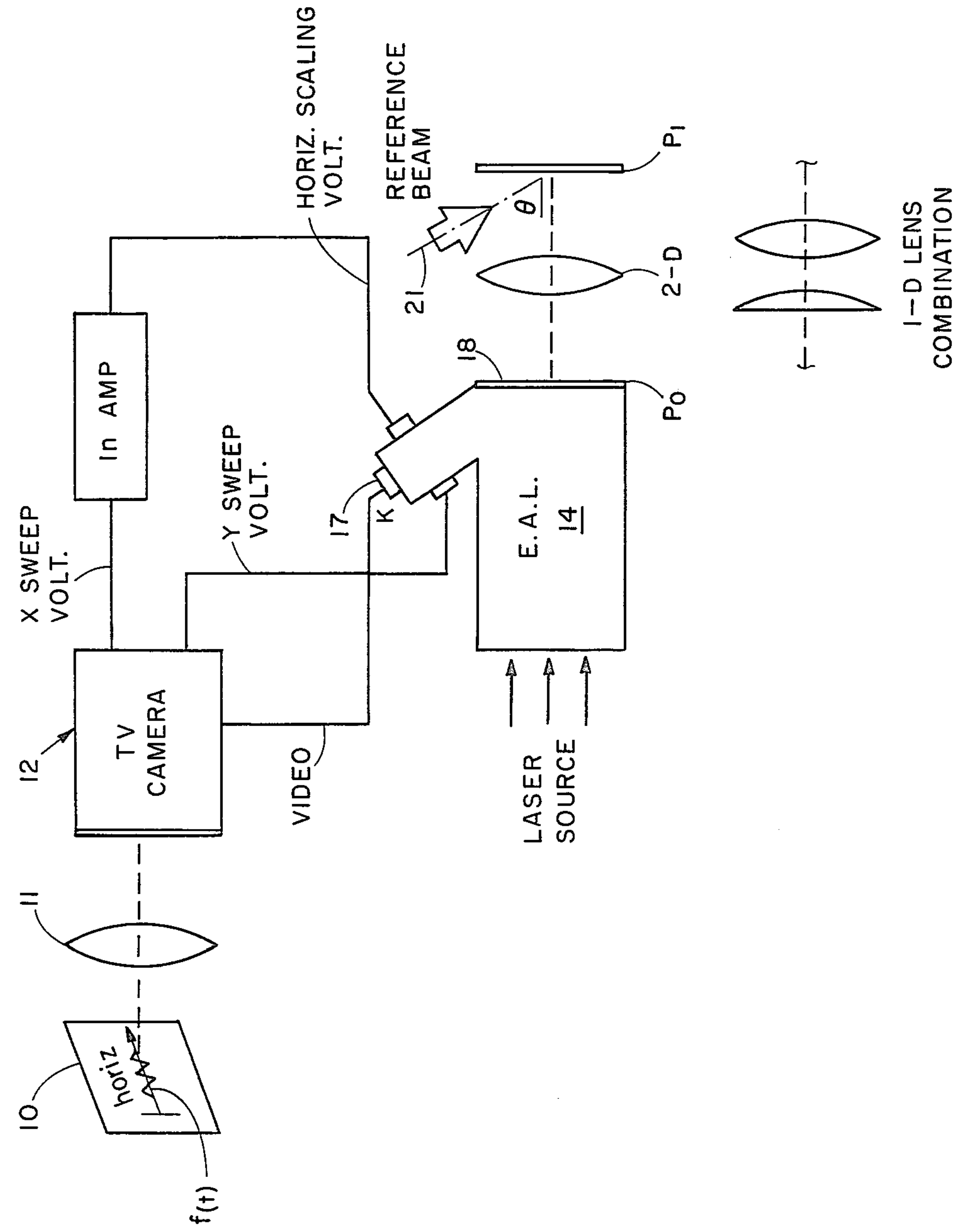
FIG. 2 shows an arrangement for producing a matched spatial filter of the type required in carrying out the method of FIG. 1.

The matched spatial filter containing $M_2$* which is needed in the method of FIG. 1 may be prepared by utilizing the apparatus shown in FIG. 2. Here, the preparation involves producing a transparency or any other recording 10 whose transmittance pattern corresponds to $f_2(t)$, written horizontally, illuminating it with a suitable light source and focusing an image thereof with lens 11 on the input of a vidicon camera 12. This forms $f_2(t)$ on the vidicon. The video output signal from this camera is coupled to the control electrode 17 of an electronically-addressed light-modulated tube 14 so as to modulate its beam current. The general construction and operation of tube 14 are described in the article, "Dielectric and Optical Properties of Electron-Beam Addressed $KD_2PO_4$" by David Casasent and William Keicher which appeared in the December 1974 issue of the Journal of the Optical Society of America, Volume 64, Number 12.

The logarithmic scaling of the time axis of $f_2(t)$ is accomplished by extracting the waveform which is responsible for the camera's horizontal sweep, subjecting it to a suitable logarithmic amplification and then using the resultant waveform to control the horizontal beam movement of the EALM tube.

The transmittance pattern appearing on target 18 of tube 14 as a result of the video signal modulation and the logarithmic scaling in the X direction corresponds to $f_2$ in the notation previously mentioned, and this waveform serves as the image at the input plane $P_O$ of a 1-D or 2-D Fourier transformation system. It will be appreciated that the spherical lens 19 shown in FIG. 2 corresponds to the 2-D case. In the 1-D case, this lens is replaced by a cylindrical lens and a cooperating spherical lens. The light distribution pattern resulting from the 2-D Fourier transformation is interferred with a reference planar wave 21 which enters the optical system at an acute angle $\theta$ with respect to the optical axis of the Fourier transform system. The interference pattern resulting from this interaction, which contains the term $M_2$*, as it appears at plane $P_1$ is recorded on suitable photographic material. An appropriate transparency may be prepared from this recording or the desired transparency with transmittance $M_2$* can be formed in real-time using an optically-addressed light modulator constructed from liquid crystals, photo DKDP and Ruticon at plane $P_1$.

Figure 3:
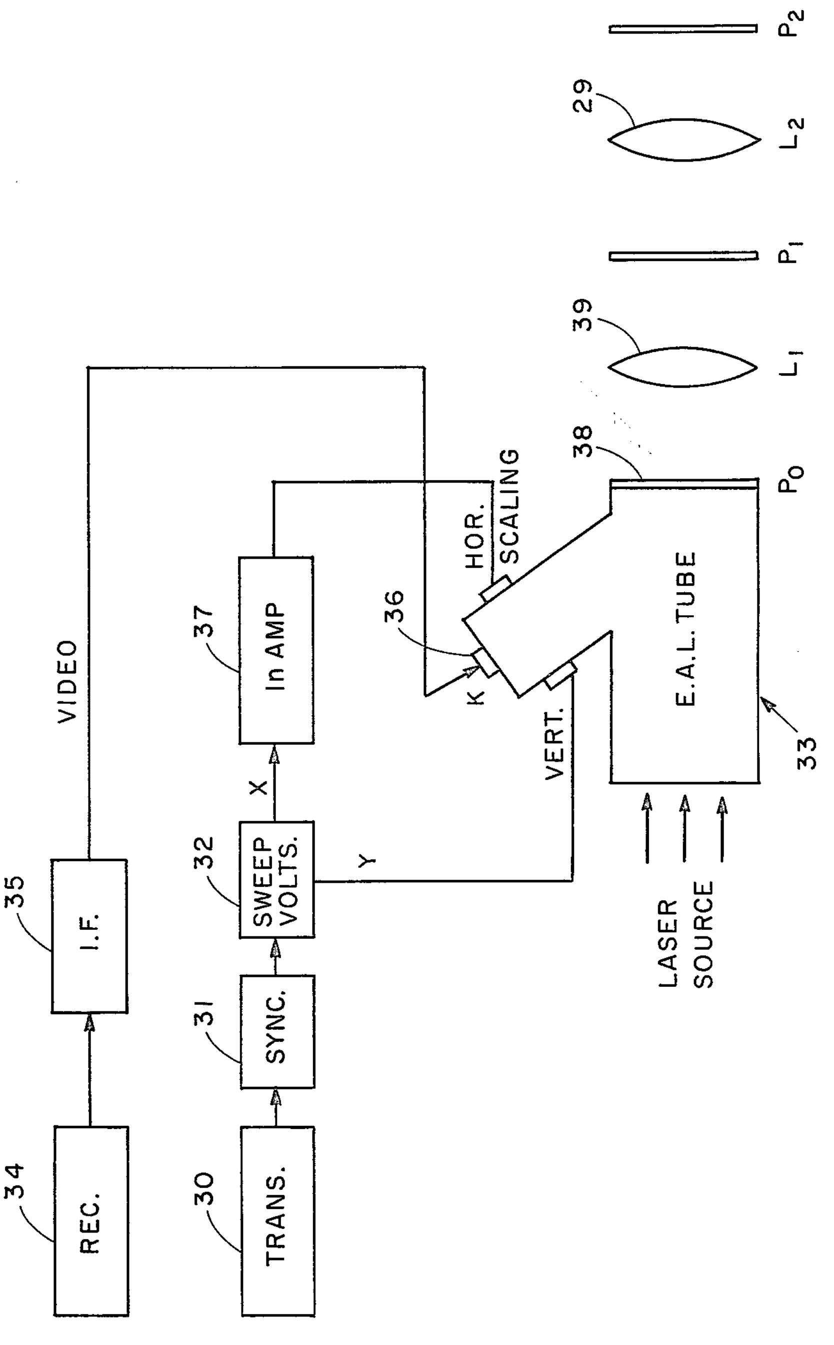
FIG. 3 is a schematic diagram showing the use of the Doppler processing technique of the present invention in a radar system.

FIG. 3 illustrates a simplified arrangement for processing radar signals so as to extract Doppler information which utilizes the holographic MSF produced in accordance with the procedure hereinabove described. In this arrangment, transmitter 30 which generates the search pulse also controls a synchronizing circuit 3 which times the operation of the horizontal and vertical sweep circuits 32 of the EALM tube 33 so that they commence at a proper time in each cycle. The echo signal detected by the receiving apparatus 34 is heterodyned, and the IF signal resulting therefrom, which is available in circuit 35, serves as the video signal that is coupled to the control electrode 36 of the EALM tube and modulates its beam current. Instead of an IF signal, a video signal at a lower frequency may be obtained by carrying out an additional mixing operation and used for this purpose. In sonar, the signal itself or a properly bandpassed version of it can be used directly.

The horizontal deflection voltage for the EALM tube is a ramp waveform that is subjected to logarithmic amplification in circuit 37. In this way, the horizontal sweep of the EALM tube beam creates a time axis which, in effect, logarithmically scales the coordinates of the video waveform coupled to the tube.

Target 38 of tube 33 serves as the input plane $P_0$ of a frequency plane correlator which may be of the 1-D or 2-D type. In this Fig., the transmittance pattern on target 38 is illuminated by a laser source, not shown, and 2-D Fourier transformed by spherical lens 39. At the back focal plane of this lens, which corresponds to plane $P_1$, the holographic MSF is positioned. The light distribution emanating from plane $P_1$, which corresponds to $M_1M_2$* is subjected to a 2-D Fourier transformation by lens 29, and the pattern appearing in 1 * focal plane of this lens at output plane $P_{22}$ * recorded.

The amplitude of each correlation peak for $f_1 * f_2$ is equal to the autocorrelation $f_2 * f_2$ of the reference signal regardless of the scale difference between the two functions or, in the case, the frequency of the detected radar signal and the replica of the transmitted pulse.

The above description treated the simplest case involving a single input signal $f_1$ and a single reference signal $f_2$. Normally, however, N input signals $f_1$ to $f_{1n}$, all different, may be present for processing with a single reference signal $f_2$. Likewise, there may be only a single input signal $f_1$ present with this signal being processed with P reference signals $f_2$ to $f_{2p}$, all different. Or, in the more complicated case, there may be N input signals $f_{1n}$ present, all different, and these signals involved with P reference signals $f_{2p}$, all different.

In the first of the above cases using 2-D transforms, the procedure involves first recording or registering the single reference signal $f_2$ at the center of $P_0$ in the apparatus of FIG. 2 and recording $M_2^*$ at $P_1$. Next, the reference signal at $P_0$ is erased, and the N signals $f_{1n}$ are recorded on N different lines at $P_0$. The resultant transmittance pattern is illuminated and the N beams, $M_{1n}$, which enter $P_1$, are multiplied by $M_2^*$. As a result, N beams, $M_{1n}M_2^*$, all at different angles, leave this plane. Lens $L_2$ transforms these product beams, forming $f_{1n} \circledast f_2$, and images these N correlations at N positions at $P_2$.

If 1-D transforms are used in the above case, the reference signal $f_2$ must be replicated N times at $P_0$ when forming $M_2^*$. The N signals $f_{1n}$ are again subsequently recorded at N different lines at $P_0$. It would be pointed out in connection with this mode of operation that the same line location at $P_0$ must be used when first writing the reference signals and then writing the input signals.

In the second case mentioned above again using 2-D transforms, the P signals $f_p$ are written or recorded on P lines at $P_0$ when forming $M_2^*$ with the apparatus of FIG. 2. Thereafter, the input signal $f_1$ is written only once at the center of $P_0$ when the processing operation is being performed.

If 1-D transforms are used in this second case, P signals $f_{2p}$ are again written on P lines at $P_0$ when forming $M_2^*$. In the complementary operation, the input signal $f_1$ is written P times at $P_0$ after the reference signals are removed.

In the third case, with 2-D transforms, the P reference signals $f_{2p}$ are recorded on P lines at $P_0$ and $M_{2p}^*$ is recorded at $P_1$. Next, if one of the N input signals, $f_{1a}$ is recorded on one line at $P_0$, at plane $P_2$, the output plane, P correlations $f_{2p} \circledast f_{1a}$ appear on P lines. With a second of the N input signals $f_{1b}$, also recorded at $P_0$, another set of P correlations, $f_{2p} \circledast f_{1b}$, appear at $P_2$. This second input signal should not be recorded in a region and on a line that was previously occupied by one of the P reference signals. If such a superpositioning occurs, the correlations will lie on top of each other at $P_2$. Thus, the various input signals $f_{1a}$, $f_{1b}$, $f_{1c}$ etc. and the various reference signals $f_{2a}$, $f_{2b}$, $f_{2c}$ etc. are placed on mutually exclusive line areas of $P_0$ when the MSF is formed and when the processing operation is being carried out. In this regard, the locations of the input signals $f_{1n}$ may be interlineated with the locations used when forming the reference signals $f_{2p}$, or they may be placed side-by-side in horizontal alignment with each set of signals occupying one-half of $P_0$. With the complete set of N input signals written, np correlations, $f_{1n} \circledast f_{2p}$ appear at $P_2$ with the location of each correlation peak proportional to the Doppler difference between the two associated signals.

Figure 4:
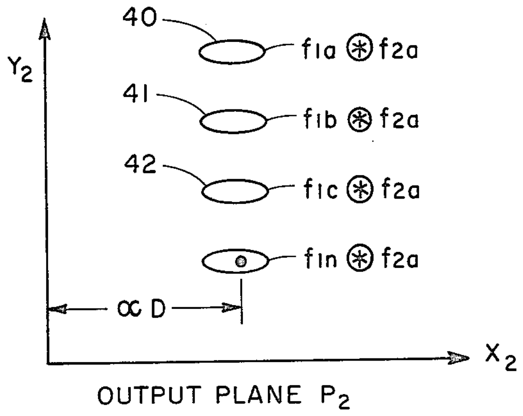
FIG. 4 shows one appearance of the output correlation plane, $P_2$ in a system like that of FIG. 3.

The input signal and the reference signal formats thus can take numerous forms, and the processor can utilize either 1-D or 2-D Fourier transformations in the optical systems as desired. Hence, if a sequence of radar echoes, for example, detected in successive cycles are arranged so as to appear on a series of equally horizontal lines at $P_0$ and with an MSF constructed with a single reference signal at $P_1$, the correlator of FIG. 3 will produce a multiplicity of correlation peaks of similar intensity in the output plane $P_2$. The appearance of this plane is schematically depicted in FIG. 4. Here, ellipse 40 represents $f_{1a} \circledast f_{2a}$, ellipse 41, $f_{1b} \circledast f_{2a}$ and so forth, with $f_{1a}$ and $f_{1b}$ designating the different radar echoes, and $f_{2a}$ the single reference signal. The correlation spot if present will occur somewhere in each of the above areas, and its precise location "D" with respect to a predetermined vertical axis will be proportional to the Doppler difference between the two signals.

Figure 5:
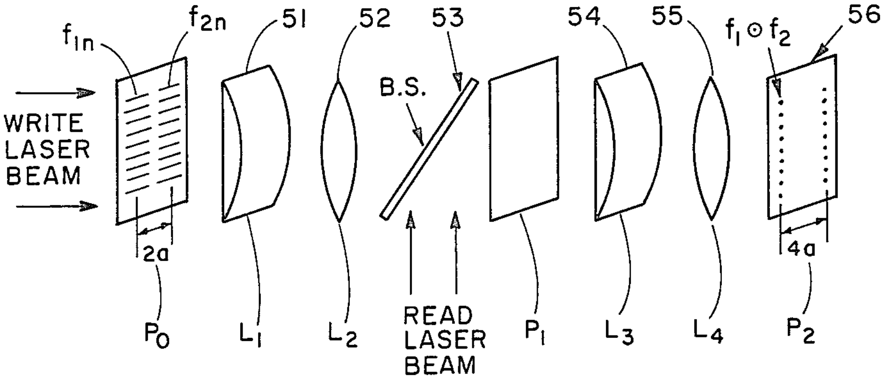
FIG. 5 shows a joint transform correlator which can be employed to extract Doppler information.

FIG. 5 shows a joint transform correlator which provides Doppler information similar to that obtainable from the system of FIG. 3. In this arrangement, the input signals, $f_{1n}$, after appropriate logarithmic scaling, are recorded on N separate lines in one-half of the input plane $P_0$. Depending upon the mode of operation selected, a single logarithmically scaled replica of the reference signal $f_{2a}$ is recorded in the other half of the input plane at a central, vertical location or a sequence of different reference signals $f_{2n}$ are recorded therein. In the latter case, $f_{1a}$ and $f_{2a}$ occupy different horizontal locations on the same line. Likewise, $f_{1b}$ and $f_{2b}$ occupy different horizontal locations on the same line and so forth. The center-to-center spacing between the two sets of recorded signals is $2a$ where "$a$" is one-half the width of the input plane. The various sets of scaled signals, as will be appreciated, may be available as suitable transparencies or they may appear on the target of an EAL tube.

The transmittance of plane $P_0$ with the above two sets of signals present can be described by $$U(x_0, y_0) = \sum_n [f_{1n}(x_0 + a) + f_{2n}(x_0 - a)] * \delta(y_0 - nd_0) \qquad (2)$$

A 1-D Fourier transform is accomplished by cyclindrical lens 51 and spherical lens 52 and the pattern recorded at plane $P_1$ is $$U(x_1, y_1) = \sum_n |M_{1n}(u)\exp(-ju\,a) + M_{2n}(u)\exp(+ju\,a)|^2 * \delta(y_1 - nd_1) \qquad (3)$$

The term of inerest in the light distribution at $P_1$ is $$\sum_n M_{2n}(u)M_{1n}^*(u)\exp(-2jua) * \delta(y_1 - n\delta_1) = \sum_n M_{1n}(u)M_{1n}^*(u)\exp(-2jua)\exp(-ju\ln b_n) * \delta(y_1 - nd_1) \qquad (4)$$

Plane $P_1$ is illuminated by a plane wave derived from a read laser source, not shown, which enters the optical system via beam splitter 53. In this modification, plane $P_1$ can consist of a real-time optically-addressed light modular which is responsive to the intensity of the illuminating light energy and changes its transmittance accordingly. The transmittance condition of the OALM is sensed by the read laser beam which may be derived from the same source that provides the write laser beam which illuminates the input plane $P_0$. It will be appreciated that the read and write beams operate during mutually exclusive time intervals. Cylindrical lens 54 and spherical lens 55 duplicate the performance of lenses 51 and 52 and perform a 1D Fourier transform of the transmittance pattern present on the OALM device. The resulting light distribution pattern appearing in the output plane can be described by $$\sum_n f_{1n} \circledast f_{1n} * \delta(x_2 - 2a - \ln b_n) * \delta(y_2 - nd_2) \qquad (5)$$

The same scale invariance of the correlation results, and, here, too, the position of the correlation peak is proportional to the scale difference or Doppler shift between the pairs of signals. As before, all correlation peaks are of the same intensity.

If the same reference signal is used with a series of input signals that are Doppler shifted then lenses 51 and 52, the 1-D combination, can be replaced by a single spherical lens. Likewise, the lens combination 54 and 55 can be replaced by a second spherical lens. These substitutions will produce a 2-D joint transform correlator. In such an arrangement, the reference signal need only be recorded once in the center of half of the input plane $P_0$. The transmittance of $P_0$ is then $$U(x_0,y_0) = f_1(x_0 + a) * \delta(y_0) + \sum_n f_{2n}(x_0 - a) * \delta(y_0 - nd_0) \quad (6)$$

The term of interest in the pattern at $P_1$ and in the subsequent transmission of $P_1$ is $$U(u, v) = \sum_n M_1^* M_{1n} \exp[-ju(2a + \ln b_n) + jv\, nd_0] \quad (7)$$

The 2-D Fourier transform of equation (7) produced at $P_2$ is then $$U(x_2, y_2) = \sum_n f_1 \circledast f_1 * \delta(x_2 - 2a - \ln b_n) * \delta(y_2 - nd_2) \quad (8)$$

which agrees with equation (5).

The same number of correlation peaks — one for each input signal — will again appear in the output plane $P_2$, and their location will be proportional to the Doppler shift.

Figure 6:
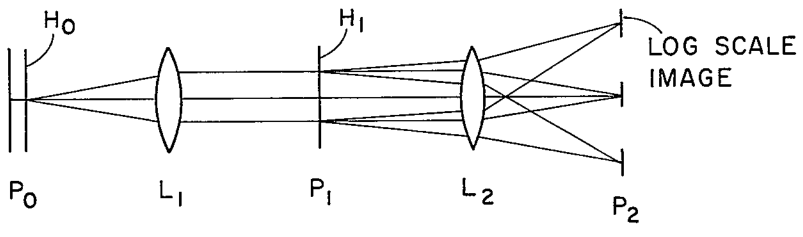
FIG. 6 shows an optical system for realizing logarithmic scaling of the input signals in parallel without the need to scan each signal.

In the arrangement shown in FIGS. 2 and 3, the logarithmic scaling of the input signal and reference signals required to implement the Mellin transform was realized by logarithmic amplifiers associated with the deflection systems of a vidicon camera and an electronically-addressed light-modulated tube. This logarithmic scaling can also be accomplished by use of a computer generated hologram mask. Such a mask $H_0$ with a phase transmittance $\phi(x) = \pi x^2/\lambda f_{L1}$ is placed in contact with a transparency of the input signals as shown in FIG. 6. This produces an extended frequency spectrum of $P_0$, the input plane, at $P_1$ with a geometrical similarity to the input. With $\phi_1(x) = u \ln u - u^2/2$ describing the phase function of a second mask $H_1$ placed over the first-order term at plane $P_1$ of the correlator, the first-order pattern at output plane $P_2$ is the desired log scale version of the input signals.

What is claimed is:

1. In a method for determining the value of the frequency component $f$ present in a composite signal $f \pm \Delta f$, the steps of procuring a film transparency having a transmittance pattern that contains the term $M_2^*$, the conjugate of the Mellin transform of the signal $f$;

illuminating said film transparency with a light distribution pattern corresponding to $M_1$, the Mellin transform of the composite $f \pm \Delta f$, so as to form a light distribution pattern corresponding to the product $M_1M_2^*$;

Fourier transforming by optical means said light distribution pattern which corresponds to $M_1M_2^*$ so as to correlate the signal $f$ and the composite signal $f \pm \Delta f$; and determining the location of the resultant correlation peak with respect to a predetermined reference coordinate system, said location providing an indication of the value of the frequency component $\Delta f$.

2. In a method for determining the value of the Doppler frequency component $\Delta f$ present in a composite signal consisting of $f \pm \Delta f$, the steps of preparing a film transparency having recorded therein a transmittance pattern that contains the term $M_2^*$, the conjugate of the Mellin transform of the signal $f$;

producing a light distribution pattern that corresponds to $M_1$, the Mellin transform of said composite signal $f \pm \Delta f$;

illuminating said film transparency with said light distribution pattern so as to form a light distribution pattern corresponding to the product $M_1M_2^*$:

Fourier transforming said last-mentioned light distribution pattern thereby to perform a correlation with the signal $f$ and the composite signal $f \pm \Delta f$; and ascertaining the value of the Doppler frequency component $\Delta f$ from measurements of the location of the correlation peak in the coordinate system in which said Fourier transform is carried out.

3. In a method as defined in claim 2 wherein said light distribution pattern corresponding to $M_1$ is formed by optical means utilizing a laser illuminating source.

4. In a method as defined in claim 2 wherein the preparation of said film transparency involves the use of holographic means.

5. In a method for determining the magnitude of a Doppler frequency shift component $\Delta f$ present in a composite signal $f \pm \Delta f$, the steps of forming a transmittance pattern of said composite signal having a horizontal scale that is the natural log of the time scale of said composite signal;

utilizing said transmittance pattern as the input image in a frequency plane optical correlator that has in the frequency plane thereof a holographic matched spatial filter that includes a term corresponding to $M^*$, said term $M^*$ being the conjugate of the Mellin transform of the signal f; and determining the horizontal distance of the correlation peak appearing in the output plane of said correlator from a vertical reference axis, said distance being proportional to $\Delta f$.

6. In a method for determining the Doppler frequency shift component $\Delta f$ present in a signal $f \pm \Delta f$, the steps of correlating the signal $f \pm \Delta f$ with the signal $f$ using a scale invariant optical correlator of the type utilizing in its operation Mellin transforms, said correlator producing a correlation peak in the output plane thereof whose horizontal distance from a vertical reference axis is proportional to the scale difference between the images being compared; and determining the horizontal distance of said correlation peak from said vertical reference axis, said distance being proportional to the Doppler frequency shift component $\Delta f$.

7. In a method for ascertaining the magnitude of the Doppler frequency shift component $\Delta f$ that is present in a signal composed of $f \pm \Delta f$, the steps of forming an image of said signal $f \pm \Delta f$ having a horizontal scale that is the natural log of the time scale of the original signal;

positioning said image in the input plane of an optical correlator that has a frequency plane and an output plane;

preparing a matched spatial filter that contains a term corresponding to $M^*$, where $M^*$ is the conjugate of the Mellin transform of the signal $f$;

positioning said matched spatial filter in the frequency plane of said optical correlator; and determining the distance between the correlation peak appearing in the output plane of said correlator and a vertical reference axis, said distance being proportional to the Doppler frequency shift component $\Delta f$.

8. In a method as defined in claim 7 wherein said matched spatial filter is prepared by recording the light distribution pattern resulting from a plane wave interfering with a Fourier transformation of a transmittance pattern corresponding to the signal $f$ modified so as to have a natural logarithmic time scale.

9. In an arrangement for determining the value of $\Delta f$ present in a signal $f \pm \Delta f$, the combination of means for converting said signal $f \pm \Delta f$ into a corresponding transmittance pattern having a horizontal scale that is the natural log of that of said signal;

a frequency plane optical correlator;

a holographic matched spatial filter having recorded therein as an interference pattern a term corresponding to M*, said term M* being the conjugate of the Mellin transform of the signal $f$, said transmittance pattern being positioned in the input plane of said correlator;

the correlation peak appearing in the output plane of said correlator when said transmittance pattern is illuminated having a horizontal displacement from a vertical reference axis that is proportional to the value of $\Delta f$.

10. In an arrangement as defined in claim 9 wherein said means for converting said signal $f \pm \Delta f$ into a corresponding transmittance pattern includes an electronically-addressed light-modulated tube, said tube having an electrode which controls the beam current thereof;

means for coupling said signal $f \pm \Delta f$ to said electrode; and means for deflecting the electron beam of said tube such that its horizontal movement is in accordance with a time scale that is a natural log of that of the signal coupled to said electrode.

11. In an arrangement as defined in claim 9 wherein said means for converting said signal $f \pm \Delta f$ into a corresponding transmittance pattern includes an electronically-addressed light-modulated tube;

means for coupling said signal $f \pm \Delta f$ to the control electrode of said tube thereby to modulate its beam's current; and means for deflecting the electron beam of said tube horizontally such that the waveform at the control electrode of said tube and the transmittance pattern formed on the target of said tube have different time scales with that of said transmittance pattern being the natural log of that of said waveform.

12. Apparatus for determining the value of a Doppler frequency shift component $\Delta f$ present in a signal $f \pm \Delta f$, comprising in combination a frequency plane optical correlator;

an image corresponding to the Mellin transform of the signal $f \pm \Delta f$ present at the input plane of said correlation; and a matched spatial filter positioned at the frequency plane of said correlator, said matched spatial filter having an interference pattern that contains the term M* which is the conjugate of the Mellin transform of the signal $f$, the location of the correlation peak appearing in the output plane of said correlator with respect to a predetermined reference axis being proportional to said frequency shift component $\Delta f$.

* * * * *